United States Patent Office 3,297,530
Patented Jan. 10, 1967

3,297,530
ANTIDEPRESSANT COMPOSITIONS AND
METHODS OF USING SAME
Albert Frederick Crowther and Edwin Harry Paterson
Young, Macclesfield, England, assignors to Imperial
Chemical Industries Limited, London, England, a corporation of Great Britain
No Drawing. Filed Nov. 16, 1959, Ser. No. 852,951
Claims priority, application Great Britain, Dec. 23, 1958,
41,454/58; June 22, 1959, 21,291/59
3 Claims. (Cl. 167—65)

This invention relates to pharmaceutical compositions and more particularly it relates to pharmaceutical compositions containing benzylhydrazine derivatives which have valuable therapeutic properties, for example certain members of the series possess antidepressant, stimulant and anticonvulsant properties whilst others in the series possess sedative and antirheumatic properties.

According to the the invention we provide pharmaceutical compositions comprising as active ingredient or ingredients one or more benzylhydrazine derivatives of the formula:

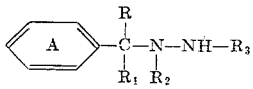

wherein R stands for a lower alkyl radical, wherein $R_1$ stands for hydrogen or a lower alkyl radical, wherein $R_2$ stands for hydrogen or an alkyl or alkoxycarbonyl radical, wherein $R_3$ stands for hydrogen or an alkyl or aralkyl radical, or $R_3$ stands for a radical of the formula COR' wherein R' stands for hydrogen or an alkyl, alkoxy, aryl or aralkyl radical, and wherein the benzene ring (A) may optionally bear further substituents, or the non-toxic pharmaceutically-acceptable acid-addition salts thereof, in admixture with non-toxic pharmaceutical excipients.

The substituent (R) is preferably the methyl radical. The substituent ($R_1$) may be, for example the methyl radical, and the substituent ($R_2$) may be, for example, the methyl or ethoxycarbonyl radical. The substituent ($R_3$) may be, for example, the methyl, α-methylbenzyl, formyl, acetyl, propionyl, n-butyryl, isobutyryl, n-valeryl, pivalyl, n-octanoyl, benzoyl 4-chlorobenzoyl, methoxycarbonyl, ethoxycarbonyl, n-propoxycarbonyl, isopropoxycarbonyl, n-butoxycarbonyl or isobutoxycarbonyl radical. Optional substituents in the benzene ring (A) may be, for example, lower alkyl radicals, for example the methyl radical, lower alkoxy radicals, for example the methoxy radical, halogen atoms, for example chlorine atoms, the benzyloxy radical or the methylenedioxy radical.

Suitable acid-addition salts of the said benzyl-hydrazine derivatives are those salts which are suitable for clinical use. Such salts include, for example, salts with inorganic acids, for example hydrochloric, sulphuric or phosphoric acid, or with organic acids, for example acetic, maleic, oxalic, lactic, tartaric, succinic, cinnamic or tannic acid, and salts with medicinally useful and compatible acidic substances, for example acidic resins, for example suphonated polystyrene resins, and especially those that are commercially available under the names of "Zeocarb 255" (registered trademark) and "Dowex 50X" (registered trademark).

Particularly useful compounds of the above stated formula are α-methylbenzylhydrazine, 1-(3',4'-dichloro-α-methylbenzyl) - 2 - methoxycarbonylhydrazine and 1-(3',4'-dichloro - α - methylbenzyl) - 2 - ethoxycarbonylhy-drazine. These componuds may be used as the free base or they may conveniently be present in the form of an acid-addition salt, for example the sulphate, oxalate, or tannate, or the salt with a sulphonated polystyrene resin, for example the salt with "Zeocarb 225" (registered trademark).

As said, certain components of the above-stated formula possess antidepressant, stimulant and anticonvulsant properties, whilst the other compounds of the above-stated formula possess sedative and antirheumatic properties. Thus compounds of the above-stated formula wherein A stands for a 3,4-dichlorophenyl radical, wherein R stands for methyl, wherein $R_1$ and $R_2$ stand for hydrogen, and wherein $R_3$ stands for a radical of the formula COR' wherein R' has the meaning stated above, and the non-toxic pharmaceutically-acceptable acid-addition salts thereof, possess sedative and antirheumatic properties. The other compounds of the above-stated formula, and the non-toxic pharmaceutically-acceptable acid - addition salts thereof, possess antidepressant, stimulant and anticonvulsant properties.

Suitable inert diluents or carries which may be used as excipients in the compositions of the invention are those known to the art and used in the preparation of pharmaceutical formulations for human and veterinary medication. Thus, the invention contemplates administration of the indicated compositions to animals as well as humans.

The said pharmaceutical compositions include compositions which are suitable for oral administration. They include, for example, solid compositions, for example, tablets, pills, capsules, dispersible powders and granules, which may optionally be coated, for example with a sweetening agent and/or a protective material designed to modify the distribution and absorption of the active ingredient or ingredients in the digestive tract.

Preferred compositions to be used in the treatment of man are solid compositions, for example coated or uncoated tablets, or capusles, containg between 5 and 50 mg. of active ingredient of the above-stated formula.

Certain of the compounds and the salts thereof used as the active ingredient in the compositions of the invention are new compounds.

Thus according to a further feature of the invention we provide benzylhydrazine derivatives of the formula:

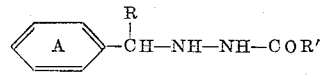

wherein R, R' and A have the meanings stated above, and the non-toxic, acid-addition salts thereof.

As suitable values for R' there may be mentioned, for example, the methyl, ethyl, n-propyl, isopropyl, n-butyl, tert.-butyl, n-heptyl, phenyl, 4-chlorophenyl, β-phenylethyl, methoxy, ethoxy, n-propoxy, isopropoxy, n-butoxy or isobutoxy radical. The substituent (R) is preferably the methyl radical, and the benzene ring (A) may optionally be substituted, as exemplified by the 4-methylphenyl, 3,4-dichlorophenyl, 3,4-methylenedioxyphenyl, 3,4-dimethylphenyl, 4-methoxyphenyl, 4-chlorophenyl, 2-chlorophenyl and 3-chlorophenyl radical.

Particularly useful compounds are 1-(α-methyl benzyl)-2-ethoxycarbonylhydrazine and the non-toxic acid-addition salts thereof.

According to yet a further feature of the invention we provide a process for the manufacture of the said new hydrazine derivatives which comprises reducing the corresponding hydrazone derivatives of the formula:

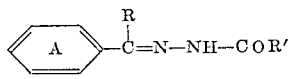

wherein R, R' and A have the meanings stated above.

The said reduction process may be carried out by any means known to the art for reducing hydrazone derivatives to hydrazine derivatives, for example by catalytic hydrogenation. As a suitable hydrogenation catalyst there may be mentioned, for example, palladium on carbon. The hydrogenation reaction may conveniently be carried out at an elevated pressure and in the presence of an inert diluent or solvent, for example ethanol.

According to yet a further feature of the invention we provide the α-methylbenzylhydrazine salt of a sulphonated polystyrene resin.

The said novel salt may be prepared by conventional procedures, for example by interaction of a salt of the base, for example the sulphate, with the acidic resin in an aqueous medium.

The invention is illustrated but not limited by the following examples in which the parts are by weight:

Example 1

A mixture of 25 parts of 1-(α-methylbenzyl)-2-acetylhydrazine, 125 parts of maize starch, 270 parts of calcium phosphate and 1 part of magnesium stearate is compressed, and the compressed material is than broken down into granules by passage through a 16 mesh screen. The granules so obtained are then compressed into tablets which are suitable for oral administration for therapeutic purposes.

The process described above is repeated except that the 1-(α-methylbenzyl)-2-acetylhydrazine is replaced by one of the following compounds:

1-(4'-methoxy-α-methylbenzyl)-2-ethoxycarbonyl-hydrazine,
1-(4'-chloro-α-methylbenzyl)-2-ethoxycarbonyl-hydrazine, or an α-methylbenzylhydrazine salt of a sulphonated polystyrene.

There are thus obtained tablets suitable for oral administration for therapuetic purposes.

Example 2

5 parts of 1-(α-methylbenzyl)-2-ethoxy-carbonylhydrazine are mixed with 100 parts of sodium dihydrogen phosphate. The mixture is filled into hard gelatine capsules and there is obtained a pharmaceutical composition suitable for oral administration for therapeutic purposes.

Example 3

The tablets obtained according to the process as described in Example 1 are coated with a mixture consisting of 20 parts of orange shellac, 10 parts of cetanol, 10 parts of stearic acid and 60 parts of ethanol. The coating process is continued until the tablets conform to the disintegration test as described in the British Pharmacopoeia (1958) at page 964 for enteric coated tablets. There are thus obtained enteric coated tablets which are suitable for oral administration for therapeutic purposes.

Example 4

62.5 parts of potassium dihydrogen phosphate and 2.5 parts of 1-(α-methylbenzyl)-2-ethoxycarbonylhydrazine are intimately mixed and then compressed into slugs as used in the double compression or slugging process for the manufacture of tablets. The slugs so formed are then broken down into granules which are mixed with 1.3 parts of talc. The mixture is then compressed into tablets which are suitable for oral administration for therapeutic purposes.

Example 5

A mixture of 29.6 parts of acetylhydrazine, 48 parts of acetophenone and 140 parts of ethanol is heated under reflux for 18 hours and is then cooled to 20–25° C. and filtered. The solid residue, M.P. 135–136° C., is washed with diethyl ether and dried at 40° C. 28.5 parts of this dried product in 180 parts of methanol is shaken in an atmosphere of hydrogen under a pressure of 100 atmospheres and at a temperature of 25° C. in the presence of 3 parts of a 5% palladium on carbon catalyst until the theoretical amount of hydrogen is absorbed. The mixture is filtered and the filtrate is evaporated. The residue is fractionally distilled under reduced pressure and there is thus obtained 1-(α-methylbenzyl)-2-acetylhydrazine, B.P. 182–186° C./15 mm., M.P. 72–74° C. Treatment of an ethereal solution of the base with an ethereal solution of oxalic acid gives the corresponding oxalate, which after crystallisation from ethyl acetate has M.P. 120–121° C.

The process described above is repeated using the appropriate starting materials and there are thus obtained the following benzylhydrazine derivatives:

1-(α-methylbenzyl)-2-ethoxycarbonylhydrazine, M.P. 59–60° C.,
1-(α-methylbenzyl)-2-methoxycarbonylhydrazine, B.P. 161–162° C./15 mm.,
1-(4'-methoxy-α-methylbenzyl)-2-ethoxycarbonylhydrazine, M.P. 73–74° C., and
1-(4'-chloro-α-methylbenzyl)-2-ethoxycarbonylhydrazine, M.P. 94–95° C.

Example 6

4.6 parts of a sulphonated polystyrene resin ("Zeocarb 225"—registered trademark) of particle size 50 microns, are added to a solution of 2 parts of α-methylbenzylhydrazine sulphate in 50 parts of water. The mixture thus obtained is stirred and filtered and the residue is washed with water and dried. There is thus obtained an α-methylbenzylhydrazine salt of sulphonated polystyrene with an α-methylbenzylhydrazine content of 35%.

Example 7

4 parts of a sulphonated polystyrene resin ("Dowex 50X"—registered trademark) of particle size 100–200 microns, are added to a solution of 2.26 parts of α-methylbenzylhydrazine oxalate in 100 parts of water. The mixture thus obtained is stirred and filtered and the residue is washed with water and dried. There is thus obtained an α-methylbenzylhydrazine salt of sulphonated polystyrene with an α-methylbenzylhydrazine content of 31%.

What we claim is:

1. The method of producing an antidepressant effect which comprises administering to animals and humans a therapeutic amount of a stimulant selected from the group consisting of a compound of the formula

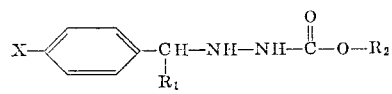

and the nontoxic acid addition salts thereof, wherein $R_1$ and $R_2$ are lower alkyl and wherein X is a member selected from the group consisting of halogen, hydrogen and lower alkoxy.

2. The method of producing an antidepressant effect which comprises administering to animals and humans an effective amount of the non-toxic acid-adidtion salt of α-methylbenzylhydrazine with a sulphonated polystyrene resin.

3. An antidepressant composition in tablet form comprising, as the active ingredient, from 5 to 50 mg. of the non-toxic acid addition salt of α-methylbenzylhydrazine with a sulphonated polystyrene resin in admixture with a non-toxic pharmaceutical carrier for said active ingredient.

References Cited by the Examiner

UNITED STATES PATENTS

| | | | |
|---|---|---|---|
| 2,854,379 | 9/1958 | Fancher | 167—65 |
| 2,872,374 | 2/1959 | Bieler | 167—65 |
| 2,900,411 | 8/1959 | Harwood | 260—501 |
| 2,912,461 | 11/1959 | Donovan | 260—562 |
| 2,914,557 | 11/1959 | Oxford | 260—501 |
| 2,917,545 | 12/1959 | Lum | 260—569 XR |
| 2,978,461 | 4/1961 | Biel | 167—65 |
| 3,000,903 | 9/1961 | Biel | 167—65 |
| 3,091,638 | 5/1963 | Gutmann | 167—65 |
| 3,162,680 | 12/1964 | Biel | 167—65 |

FOREIGN PATENTS

| | | |
|---|---|---|
| 791,281 | 2/1958 | Great Britain. |

OTHER REFERENCES

Abrahams: Lancet, Dec. 28, 1957, p. 1317–1318, 167–72B.

Barsa: Amer. J. of Psychiatry, 115:6, December 1958, p. 543.

Biel: Annal. of N.Y. Acad. of Sci., 80:3, 1959, Conference, November 1958, pp. 568–581.

Cass: Annal. of Internal medicine, vol. 49, pp. 151–160, July 1958.

Chauhry: J. Pharm. and Pharmacol, 8, pp. 975–86, 1956.

Chessin: Annal. of N.Y. Acad. of Sci., 80:3, 1959 Conference, November 1958, pp. 597–608.

Drug Trade News, 33:9, May 1958, p. 64.

Drug Trade News, Mfg. News Sec., 33:19, pp. 59 and 80, September 1958.

Lesser: Drug and Cosmetic Ind., September 1951, 69:3, p. 316–7, 378–9, 396–401.

SAM ROSEN, *Primary Examiner.*

M. O. WOLK, *Examiner.*

J. S. SAXE, PAUL SABATINE, *Assistant Examiners.*